(12) United States Patent
Holzinger

(10) Patent No.: US 8,770,807 B2
(45) Date of Patent: Jul. 8, 2014

(54) METHOD AND DEVICE FOR INCREASING THE ROBUSTNESS OF A VEHICLE HEADLIGHT HAVING A CYLINDRICAL PRISM

(75) Inventor: Stefan Holzinger, Vienna (AT)

(73) Assignee: Continental Automotive GmbH, Hannover (DE)

( * ) Notice: Subject to any disclaimer, the term of this patent is extended or adjusted under 35 U.S.C. 154(b) by 86 days.

(21) Appl. No.: 13/642,586

(22) PCT Filed: Apr. 13, 2011

(86) PCT No.: PCT/EP2011/055826
§ 371 (c)(1),
(2), (4) Date: Oct. 22, 2012

(87) PCT Pub. No.: WO2011/131538
PCT Pub. Date: Oct. 27, 2011

(65) Prior Publication Data
US 2013/0033882 A1    Feb. 7, 2013

(30) Foreign Application Priority Data

Apr. 21, 2010  (DE) .......................... 10 2010 015 822

(51) Int. Cl.
*B60Q 1/08* (2006.01)
(52) U.S. Cl.
USPC ............................. 362/466; 362/467; 315/82
(58) Field of Classification Search
CPC .............. B60Q 1/02; B60Q 1/04; B60Q 1/06; B60Q 1/076; B60Q 1/08; B60Q 1/085; B60Q 1/10; B60Q 1/1007; B60Q 1/0023; B60Q 2200/00; B60Q 2200/30; B60Q 2200/38; F21S 48/10; F21S 48/17; F21S 48/1726; F21S 48/1742; F21S 48/1757; F21V 14/00; F21V 14/003
USPC ......... 362/464–467, 523, 525, 269, 276, 285, 362/287, 418, 427, 802; 315/77, 80, 82
See application file for complete search history.

(56) References Cited

U.S. PATENT DOCUMENTS

| 5,343,371 A | 8/1994 | Kobayashi et al. ........... 362/538 |
| 2004/0046508 A1* | 3/2004 | Ishida ............................. 315/77 |

(Continued)

FOREIGN PATENT DOCUMENTS

| CH | 696067 AS | 12/2006 | ............. B60Q 1/076 |
| DE | 19909413 A1 | 9/2000 | ............... B60Q 1/08 |

(Continued)

OTHER PUBLICATIONS

German Office Action, Application No. 10 2010 015 822.4-56, 4 pages, Dec. 13, 2010.

(Continued)

*Primary Examiner* — Thomas Sember
(74) *Attorney, Agent, or Firm* — King & Spalding L.L.P.

(57) ABSTRACT

A method is provided for increasing the robustness of a vehicle headlight comprising a cylindrical prism that can rotate about a rotary axis in a plurality of rotary positions and comprising a Hall effect sensor by means of the output signals of which the rotary position of the cylindrical prism can be determined. According to the method, a check is made as to whether a defect of the Hall effect sensor is present. In the event of a defect of the Hall effect sensor, a stop is temporarily provided and the rotary position of the prism is verified by being blocked at the provided stop.

13 Claims, 2 Drawing Sheets

(56) References Cited

U.S. PATENT DOCUMENTS

| | | | |
|---|---|---|---|
| 2004/0090788 A1* | 5/2004 | Ishida | 362/467 |
| 2005/0201117 A1 | 9/2005 | Sugimoto et al. | 362/539 |
| 2010/0164382 A1 | 7/2010 | Lee et al. | 315/82 |
| 2013/0033882 A1 | 2/2013 | Holzinger | 362/465 |

FOREIGN PATENT DOCUMENTS

| | | | | |
|---|---|---|---|---|
| DE | 10331869 A1 | 3/2005 | | B60Q 1/08 |
| DE | 10334553 A1 | 6/2005 | | F21V 14/08 |
| DE | 202007011199 U1 | 10/2007 | | B60Q 1/10 |
| DE | 102009018391 A1 | 12/2009 | | B60Q 1/08 |
| WO | 2011/131538 A1 | 10/2011 | | F21V 14/08 |

OTHER PUBLICATIONS

International Search Report and Written Opinion, Application No. PCT/EP2011/055826, 18 pages, Jun. 7, 2011.

* cited by examiner

METHOD AND DEVICE FOR INCREASING THE ROBUSTNESS OF A VEHICLE HEADLIGHT HAVING A CYLINDRICAL PRISM

CROSS-REFERENCE TO RELATED APPLICATIONS

This application is a U.S. National Stage Application of International Application No. PCT/EP2011/055826 filed Apr. 13, 2011, which designates the United States of America, and claims priority to DE Application No. 10 2010 015 822.4 filed Apr. 21, 2010, the contents of which are hereby incorporated by reference in their entirety.

TECHNICAL FIELD

This disclosure relates to a method and an apparatus for increasing the robustness of a vehicle headlight having a cylindrical prism, which in normal operation has no stop.

BACKGROUND

In vehicle headlights of more recent design, a plurality of stepper motors are used in order to move desired headlight parts to desired positions.

It is known, for example, to use a stepper motor to regulate the headlight range of the headlight.

It is furthermore already known to move a trim using a solenoid in order to switch between low beam and high beam.

Furthermore, headlights with a bending light function are already known. Here, a drive is used to rotate the entire optical construction of the headlight. The rotary movement is limited in both directions by end stops.

It is also known to perform driving of a trim of the headlight using a stepper motor. In this case, the trim is moved to the right or left and/or up or down.

It is also already known to insert a rotatable prism horizontally into the beam path of the headlight. Such a prism is driven using a stepper motor. By rotating the prism, a more or less continuously variable transition between low beam and high beam can be realized. Such a headlight has a Hall sensor, the output signals of which are used to position the rotatable prism. In case of a defect of the Hall sensor, the rotatable prism has a stop element, using which the prism can be positioned by way of rotation at a stop counter element. The rotatability of the prism is limited by the cooperation of stop element and stop counter element. Full rotation of the prism is not possible.

One example of such a rotatable prism is illustrated in FIG. 1. It has various rotary positions. A first rotary position D1 is associated with a symmetrical light distribution, a second rotary position D2 with the low beam, a third rotary position D3 with the motorway light and a fourth rotary position D4 with the high beam of the respective vehicle headlight. Located at a fifth rotary position, provided between the rotary position D4 that is associated with the high beam and the rotary position D1 that is associated with the symmetrical light distribution, is the aforementioned stop element AE1. Switch edges SF derived from the output signal of the Hall sensor occur between the first and the second rotary position and between the third and the fourth rotary position. The aforementioned stop element AE1 furthermore ensures during operation of the headlight that a transition from symmetrical light distribution to high beam and vice versa cannot occur.

The prism PR shown is a constituent component of a vehicle headlight which additionally has a reflector R, a light source Q arranged inside the reflector, and a lens L.

It is furthermore already known to capture the oncoming traffic using a camera and to maintain a switched-on high beam, but to dim that region in which oncoming vehicles are situated so as not to blind the oncoming traffic. To realize such a partial high beam, the function partial high beam is associated with a further rotary position of the rotatable prism. The exact position of the screened portion is determined by the bending light function. However, in this case the stop element AE1 shown in FIG. 1 must be removed since not only must it be possible to change from the partial high beam to the high beam, but it must also be possible to change from the partial high beam to the low beam, where the latter change must not proceed via the high beam. One example of such a rotatable prism is illustrated in FIG. 2.

The prism PR shown by way of example in FIG. 2 is likewise a constituent component of a vehicle headlight which additionally has a reflector R, a light source Q arranged inside the reflector, and a lens L. It, too, is rotatable into different rotary positions. A first rotary position D1 is associated with a symmetrical light distribution, a second rotary position D2 with the low beam, a third rotary position D3 with the motorway light, a fourth rotary position D4 with the high beam, and a fifth rotary position D5 with the partial high beam. The stop element AE1, shown in FIG. 1, is not provided in the prism shown in FIG. 2. Switch edges SF derived from the output signal of the Hall sensor occur between the first and the second rotary position and between the third and the fourth rotary position. The absence of the stop element shown in FIG. 1 allows—as has already been discussed—a transition between low beam and partial high beam.

The prism shown in FIG. 2 operates without problems as long as the Hall sensor operates correctly and provides output signals, on the basis of which the rotary position of the prism can be ascertained. If the Hall sensor fails, however, the rotary position of the prism can no longer be ascertained. Owing to the construction of the vehicle headlight, it is also not possible in that case to set a rotary position of the prism that reliably does not blind the oncoming traffic. Although the rotary position of the prism should not change by itself owing to the detent torque of the drive of the prism, it cannot be ruled out that information relating to the instantaneous rotary position of the prism is lost on account of mechanical stress, of vibration, electrical faults, a power loss during the movement, manual interference or a cable break of a stepper motor coil.

SUMMARY

In one embodiment, a method is provided for increasing the robustness of a vehicle headlight, which has a cylindrical prism, which is rotatable about a rotary axis into a plurality of rotary positions using a first drive, and a Hall sensor, on the basis of the output signals of which the rotary position of the cylindrical prism is ascertainable, the method having the following steps: a check is carried out whether a defect of the Hall sensor is present, and in the event of the presence of a defect, a stop is temporarily provided and the rotary position of the prism is verified by blocking it at the provided stop.

In a further embodiment, the rotatable prism is brought into a desired rotary position starting from the stop position. In a further embodiment, the stop is provided using a second drive. In a further embodiment, the stop is provided using a second drive which is present in any case and has a double function. In a further embodiment, the positioning of the cylindrical prism at the provided stop is carried out by axial displacement and subsequent rotation of the cylindrical prism. In a further embodiment, the stop for the prism is provided at an end stop of the second drive. In a further embodiment, during subsequent rotation of the cylindrical prism to the stop, a stop element provided at the cylindrical prism is positioned at a stop counter element of the end stop. In a further embodiment, the method is carried out in connection with a reference run.

In another embodiment, an apparatus for increasing the robustness of a vehicle headlight comprises: a cylindrical prism, which is rotatable about a rotary axis into a plurality of rotary positions using a first drive, and a Hall sensor, on the basis of the output signals of which the rotary position of the cylindrical prism is ascertainable, wherein said apparatus has a control unit which is provided for carrying out the following steps: a check is carried out whether a defect of the Hall sensor is present, and in the event of the presence of a defect, a stop is temporarily provided and the rotary position of the prism is verified by blocking it at the provided stop.

In a further embodiment, the apparatus comprises a second drive, which is used to provide the stop. In a further embodiment, the control unit is provided for bringing the rotatable prism into a desired rotary position starting from the stop position. In a further embodiment, the second drive is a drive which is present in any case and has a double function. In a further embodiment, a stop element is provided at the cylindrical prism and a stop counter element is provided at an end stop of the motor-vehicle headlight.

BRIEF DESCRIPTION OF THE DRAWINGS

Example embodiments will be explained in more detail below with reference to figures, in which.

DETAILED DESCRIPTION

Some embodiment provide a method and an apparatus, in which the rotary position of the prism can be ascertained even if the Hall sensor fails.

In some embodiments, if a defect of the Hall sensor occurs in a vehicle headlight, the rotary position of the cylindrical prism can be verified. This may be achieved by checking, e.g., in connection with a reference run, whether a defect of the Hall sensor is present, and, in the event of the presence of a defect of the Hall sensor, by temporarily providing a stop and verifying the rotary position of the prism by blocking it at the provided stop. If the rotary position of the prism is verified, the prism can be moved for example to a safety position, for example the low-beam position.

Figure 1:
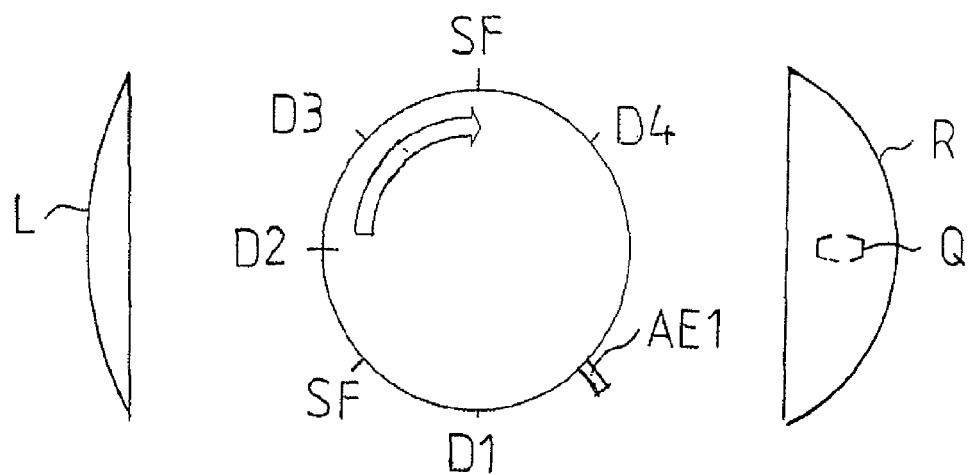
FIG. 1 shown an example of a known rotatable prism including a stop element.
Figure 2:
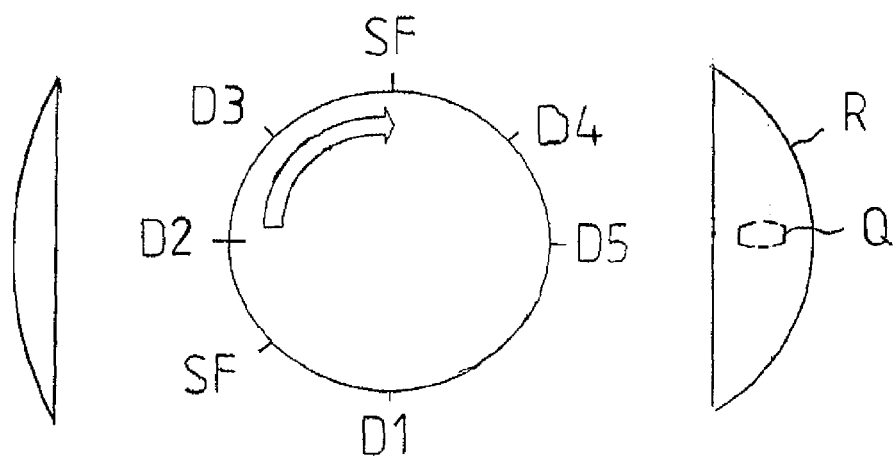
FIG. 2 shown an example of a known rotatable prism without a stop element.
Figure 3:
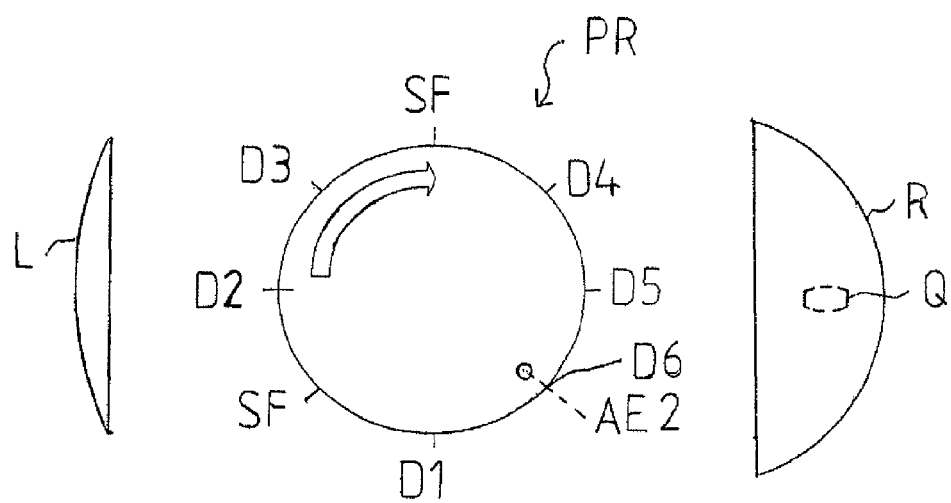
FIG. 3 illustrates an example cylindrical, rotatable prism according to an example embodiment.

FIG. 3 illustrates a cylindrical, rotatable prism PR, which is rotatable into different rotary positions. A first rotary position D1 is associated with a symmetrical light distribution, a second rotary position D2 with the low beam, a third rotary position D3 with the motorway light, a fourth rotary position D4 with the high beam, and a fifth rotary position D5 with the partial high beam. At a sixth rotary position D6, the rotatable prism PR has a stop element AE2 (indicated by a dashed line), which during normal operation of the headlight does not prevent full rotation of the prism PR. Switching edges SF derived from the output signal of a Hall sensor occur between the first and the second rotary position and between the third and the fourth rotary position.

The prism PR shown is a constituent component of a vehicle headlight, which furthermore has a reflector R, a light source Q arranged inside the reflector, and a lens L.

A check is carried out, e.g., in a reference run of the motor-vehicle headlight, whether a defect of the Hall sensor is present. In the event the presence of a defect of the Hall sensor is detected, the method can proceed to a detection of the rotary position of the rotatable prism PR, as will be explained below by way of example with reference to FIG. 4.

Figure 4:
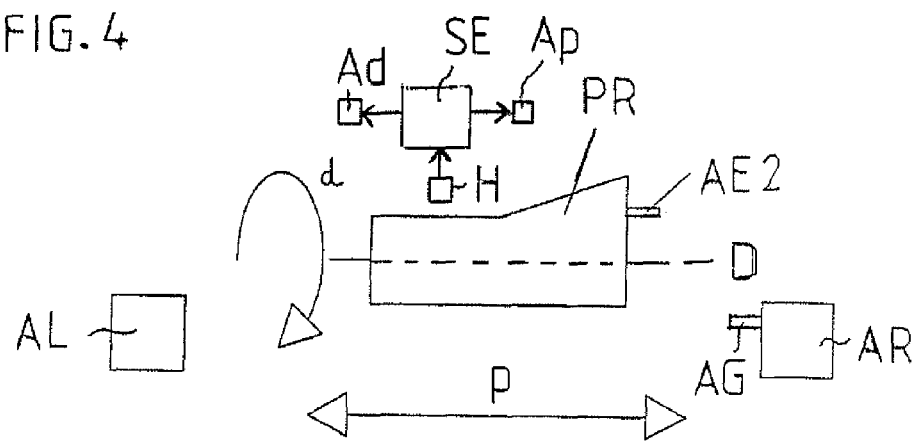
FIG. 4 illustrates an apparatus for carrying out a method for controlling a rotatable prism, according to an example embodiment.

FIG. 4 illustrates an apparatus for carrying out a method according to an example embodiment. For providing information, from which the rotary position of the prism PR can be ascertained, a Hall sensor H is provided, whose output signals are fed to a control unit SE. Said control unit SE is provided for ascertaining, using the output signals of the Hall sensor H, the instantaneous rotary position of the rotatable prism PR and for feeding control signals to a drive Ad, such that the drive controls the rotation of the prism PR in the desired manner. The control unit SE is furthermore provided for checking whether the Hall sensor H operates correctly or is defective. If, for example, in a reference run of the headlight only output signals of the Hall sensor H with matching level (HIGH or LOW) arrive at the control unit SE during a full rotation of the cylindrical prism, the control unit SE detects that a defect of the Hall sensor H is present.

The example apparatus shown in FIG. 4 furthermore has a left-side end stop AL and a right-side end stop AR of the bending light function of the vehicle headlight.

If the headlight is adjusted in the context of the bending light function, the cylindrical prism PR is displaced in the axial direction, as is indicated in FIG. 4 by the arrow p.

The displacement of the cylindrical prism PR to the left is limited by the end stop AL. The displacement of the cylindrical prism PR to the right is limited by the end stop AR. For such a displacement of the cylindrical prism PR in the axial direction, the control unit SE feeds control signals to a drive Ap.

The rotatability of the prism PR into different rotary positions is illustrated by the arrow d.

The rotatable prism PR has, on its front end, a stop element AE 2.

If the control unit SE detects that a defect of the Hall sensor is present, the prism PR is displaced axially, in a first step, in order to detect the rotary position of the rotatable prism PR, using the drive Ap in the direction of the end stop AR of the bending light function until it strikes this end stop AR. Then, in a second step, the drive Ad is used to rotate the prism PR until the stop element AE2 of the prism PR strikes a stop counter element AG of the end stop AR of the bending light function. Starting from this stop position, the prism PR can then be rotated, under control by the control unit SE, into a desired rotary position, for example into a safety position, for example the low-beam position.

In the first step, it is also possible, as an alternative to a displacement of the prism to the end stop AR, to displace the end stop AR to the prism.

One advantage of certain embodiments is that the complexity for providing a stop of the prism that determines a reference position is low, because an end stop of the headlight that is present in any case, for example an end stop of the bending light function of the vehicle headlight, is used for the provision of the stop. Said end stop of the bending light function is provided with a stop counter element for a stop element of the rotatable prism, wherein the stop element of the rotatable prism does not impede the rotary movement of the prism when the Hall sensor operates without defect and wherein, after a defect of the Hall sensor has been detected, the prism is brought into an axial and rotatory stop position in order to obtain a reference position for the rotary position of the prism. From this reference position, it is then possible to change the rotary position of the prism such that a desired rotary position of the rotatable prism is assumed.

A further alternative is to allow a pin provided on the cylindrical prism to move into a groove provided in the stop counter element in order to verify a reference position of the rotatable prism. Alternatively, the groove can also be provided in the prism and the pin on the stop counter element, wherein the groove has a web against which the pin abuts if the latter is located in the groove.

A further alternative is for the provided stop to be represented by a solenoid. This solenoid moves for example a pin into a groove of the cylindrical prism, wherein a web in the groove represents the provided stop.

Furthermore, the stop can be represented by a pin, which strikes a further pin as stop counter element.

The reference position to be targeted may be provided outside the normal movement range of the headlight, for example—as stated above—directly at an end stop of the vehicle headlight. In principle it is, however, also possible for a reference position to be provided at any other location for example of the bending light function.

These reference positions or stops, which in the case of a failure of the Hall sensor provide an emergency stop, also ensure protection against destruction.

A further alternative is to use the drive of a headlight range control of the headlight in order to provide an emergency stop. This headlight range control moves the headlight about a horizontal rotary axis using the further drive. The stop provided using this further drive may be arranged at the bottom. This may advantageously provide that, in connection with the reference run, first a maximum downward movement is typically carried out in order to minimize the risk of blinding the oncoming traffic. Thus, the emergency stop for the prism is automatically made available without further measures.

The stop provided can be provided using a single further drive or with the shared use of a plurality of drives of the vehicle headlight.

One further alternative is to use sprung trims with cam disks for temporarily providing an emergency stop, which during normal operation in turn operate without stop, i.e. are rotatable through 360°.

What is claimed is:

1. A method for increasing the robustness of a vehicle headlight having a cylindrical prism that is rotatable about a rotary axis using a first drive, and a Hall sensor that generates output signals for determining a rotary position of the cylindrical prism, the method comprising:
   performing a check to identify a defect of the Hall sensor,
   in response to identifying a defect of the Hall sensor:
   automatically moving the prism to a predefined stop position in which a movement of the prism is blocked by a physical stop, and
   automatically moving the prism from the predefined stop position to another predefined position.

2. The method of claim 1, wherein automatically moving the prism from the predefined stop position to another predefined position comprises rotating the prism to a predefined rotary position relative to the stop position.

3. The method of claim 1, wherein moving the prism to the predefined stop position includes moving the prism with a second drive.

4. The method of claim 3, wherein the second drive provides an axial displacement of the prism.

5. The method of claim 1, wherein moving the cylindrical prism to the predefined stop position includes an axial displacement and a subsequent rotation of the cylindrical prism.

6. The method of claim 5, wherein the predefined stop position for the prism is provided at an end stop of the second drive.

7. The method of claim 6, wherein the subsequent rotation of the cylindrical prism comprises rotating the prism until a stop element provided on the cylindrical prism contacts a stop counter element of the end stop.

8. The method of claim 1, wherein the check to identify the defect of the Hall sensor is performed in connection with a reference run.

9. An apparatus for increasing the robustness of a vehicle headlight, comprising:
   a cylindrical prism rotatable about a rotary axis to a plurality of rotary positions using a first drive, and
   a Hall sensor that generates output signals for determining a rotary position of the cylindrical prism,
   a control unit configured to:
   perform a check to identify a defect of the Hall sensor is present, and
   in response to identifying a defect of the Hall sensor:
   automatically move the prism to a predefined stop position in which a movement of the prism is blocked by a physical stop, and
   automatically move the prism from the predefined stop position to another predefined position.

10. The apparatus of claim 9, comprising a second drive configured to move the prism toward the predefined stop position.

11. The apparatus of claim 9, wherein automatically moving the prism from the predefined stop position to another predefined position comprises rotating the prism to a predefined rotary position relative to the stop position.

12. The apparatus of claim 10, wherein the second drive provides an axial displacement of the prism.

13. The apparatus of claim 9,
   wherein a stop element is provided at the cylindrical prism and a stop counter element is provided at an end stop of the motor-vehicle headlight, and
   wherein moving the cylindrical prism to the predefined stop position includes an axial displacement, and a subsequent rotation of the cylindrical prism until a stop element provided on the cylindrical prism contacts a stop counter element of the end stop.

* * * * *